United States Patent
Mukherjee et al.

(10) Patent No.: US 10,764,072 B2
(45) Date of Patent: Sep. 1, 2020

(54) SYSTEMS AND METHODS FOR CONFIGURING A PRIVATE MULTI-ACCESS EDGE COMPUTING ENVIRONMENT

(71) Applicant: Verizon Patent and Licensing Inc., Arlington, VA (US)

(72) Inventors: Amitav Mukherjee, Elk Grove, CA (US); Patricia R. Chang, San Ramon, CA (US); Anil K. Guntupalli, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/255,230

(22) Filed: Jan. 23, 2019

(65) Prior Publication Data
US 2020/0235952 A1 Jul. 23, 2020

(51) Int. Cl.
| | |
|---|---|
| H04W 4/40 | (2018.01) |
| H04L 12/14 | (2006.01) |
| H04L 12/24 | (2006.01) |
| H04W 8/22 | (2009.01) |
| H04W 12/06 | (2009.01) |
| G06F 9/455 | (2018.01) |
| H04W 8/04 | (2009.01) |

(52) U.S. Cl.
CPC ...... *H04L 12/1407* (2013.01); *G06F 9/45558* (2013.01); *H04L 41/5019* (2013.01); *H04W 8/04* (2013.01); *H04W 8/22* (2013.01); *H04W 12/06* (2013.01); *G06F 2009/45595* (2013.01)

(58) Field of Classification Search
CPC ............ H04L 12/1407; H04L 41/5019; G06F 9/45558; G06F 2009/45595; H04W 12/06; H04W 8/04; H04W 8/22
See application file for complete search history.

(56) References Cited

U.S. PATENT DOCUMENTS

| | | | |
|---|---|---|---|
| 8,154,741 B2 * | 4/2012 | Furst | G06Q 10/0875 358/1.15 |
| 10,405,263 B2 * | 9/2019 | Mukherjee | H04W 12/0806 |
| 10,595,191 B1 * | 3/2020 | Mueller | H04W 16/14 |
| 2012/0092727 A1 * | 4/2012 | Furst | G06Q 10/0875 358/1.15 |
| 2018/0198867 A1 * | 7/2018 | Dao | H04W 76/34 |
| 2018/0343567 A1 * | 11/2018 | Ashrafi | H04L 67/10 |
| 2018/0352594 A1 * | 12/2018 | Iwai | H04W 76/12 |

(Continued)

*Primary Examiner* — Jay P Patel

(57) ABSTRACT

An example method described herein includes obtaining a private identifier for a private radio access network (RAN). The private identifier may be used by a user equipment (UE) to access the private RAN. The method may include deploying network functions to one or more devices of a private network platform. The network functions may be associated with one or more radio access technologies (RATs). The method may include configuring the private network platform to host the network functions to provide a private multi-access edge computing (MEC) environment. The private MEC environment may be configured to host one or more MEC applications. The method may include configuring a communication interface between the private RAN and the private MEC environment to enable the UE to access, via the private RAN, the private MEC environment and performing an action associated with the private MEC environment.

20 Claims, 9 Drawing Sheets

(56) References Cited

U.S. PATENT DOCUMENTS

| | | | |
|---|---|---|---|
| 2019/0044740 A1* | 2/2019 | Smith | H04L 9/3213 |
| 2019/0045033 A1* | 2/2019 | Agerstam | H04L 63/10 |
| 2019/0140919 A1* | 5/2019 | Smith | H04L 41/5009 |
| 2019/0246335 A1* | 8/2019 | Mukherjee | H04L 63/10 |
| 2019/0319858 A1* | 10/2019 | Das | H04L 27/2637 |
| 2019/0387062 A1* | 12/2019 | Enat | H04W 36/08 |
| 2020/0067926 A1* | 2/2020 | Smith | H04W 12/08 |
| 2020/0076815 A1* | 3/2020 | Smith | G06F 21/6218 |
| 2020/0120182 A1* | 4/2020 | Kotecha | H04L 47/70 |
| 2020/0120458 A1* | 4/2020 | Aldana | H04W 28/22 |
| 2020/0137621 A1* | 4/2020 | Yang | H04W 48/16 |

* cited by examiner

SYSTEMS AND METHODS FOR CONFIGURING A PRIVATE MULTI-ACCESS EDGE COMPUTING ENVIRONMENT

BACKGROUND

In a multi-access edge computing (MEC) environment, computing is enabled by a network architecture that provides computing capabilities, to a user device, via computing platforms at or near an edge of a network (e.g., a wireless communication network, such as a cellular network). Because a MEC environment can provide computing at or near the edge of the network, increased performance may be achieved over network architectures that provide computing from the core of the network, which may be located topologically and/or physically further from the user device than a MEC environment. Such increased performance may be achieved in the MEC environment, over other network architectures, due to less traffic and/or congestion between a user device and the computing platform, less latency (due to the closer proximity), increased flexibility (due to a greater amount of computing platforms), and/or the like.

5G/New Radio (NR) is a next generation global wireless standard. NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

DETAILED DESCRIPTION OF PREFERRED EMBODIMENTS

Figure 1A:
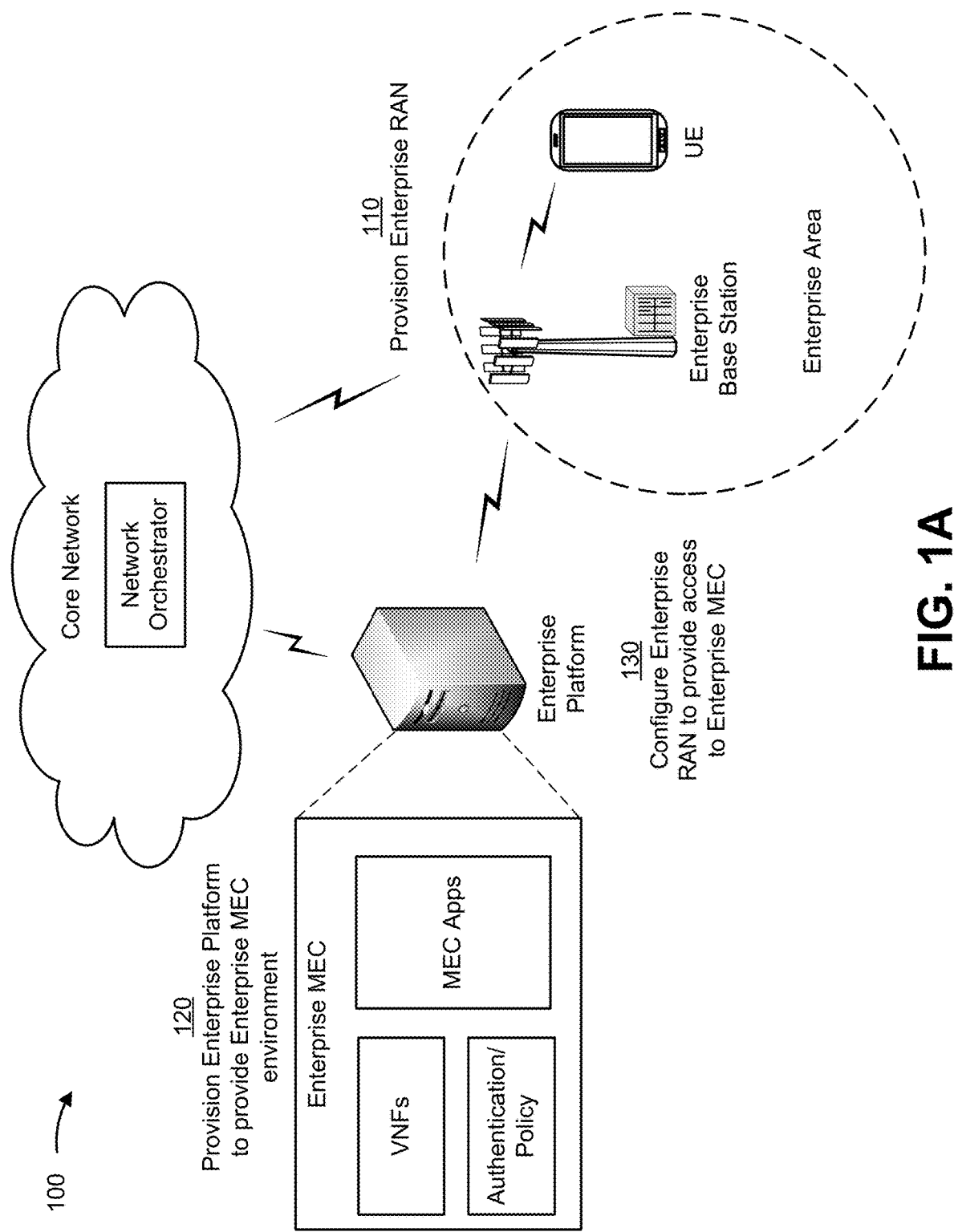
FIGS. 1A-1D are diagrams of an example implementation described herein.

The following detailed description of example implementations refers to the accompanying drawings. The same reference numbers in different drawings may identify the same or similar elements.

In some instances, an application may utilize both resources of a user equipment (UE) and resources of a multi-access edge computing (MEC) environment (e.g., resources of a server device in the cloud environment) while the application is running. Examples of such an application may include augmented reality applications, virtual reality applications, image processing applications (e.g., which include mapping, security, and/or the like), autonomous vehicle control applications (e.g., which include high definition (HD) mapping, safety infrastructure, and/or the like), and/or the like. In some cases, most or all processing of the application may be offloaded to the MEC environment because the UE may not have the computing resources (e.g., processing power and/or memory resources) to perform the processing and the UE may simply display information provided from the cloud environment. In some instances, such MEC environments may be private environments that are controlled, (e.g., owned, leased, operated, and/or the like) by an entity (e.g., an individual, a business, a group, an association, and/or the like). For example, an enterprise (or other type of entity) may set up a private enterprise MEC environment that can be accessed only by UEs associated with the entity (e.g., UEs registered to and/or utilized by employees and/or representatives of the enterprise). However, previous techniques for implementing the private MEC environments may utilize radio access technologies (RATs) that do not provide a throughput, reliability, latency, quality of service (QoS), network slicing, scalability, and agility required for certain applications (e.g., MEC applications) to run partially or entirely within the private environment. For example, such RATs may include LTE technologies that cannot support a service-based architecture needed for certain MEC applications (e.g., because the LTE technologies do not allow for flexible resource allocation and/or slot structure).

According to some implementations described herein, a private network platform is configured to provide ultra-reliable low-latency communication (URLLC), QoS on a per-flow basis, relatively high throughput, native support for control and user plane separation (CUPS), enhanced scalability, and enhanced agility over previous techniques. In some implementations, a network orchestrator may configure a private radio access network (RAN), deploy, to a private network platform, network functions associated with a RAT that uses flexible resource allocation, configure the private network platform to provide a private MEC environment that hosts one or more MEC applications, and configure a communication interface between the private RAN and the private MEC environment. In some implementations, the RAT includes a $5^{th}$ generation wireless communication system (5G) RAT, such as enhanced LTE (eLIE) and/or New Radio (NR). As such, the network functions may include 5G network functions that permit flexible bandwidth allocation. Accordingly, the network orchestrator may configure a 5G private MEC environment that can host one or more MEC applications that require a service-based architecture of 5G wireless communication (e.g., an architecture that provides URLLC, relatively high throughput, flexible bandwidth allocation, flexible slot structure, network slicing, and/or the like). Furthermore, a 5G private MEC environment can be configured that permits an entity to host, run, and/or provide services associated with MEC applications (e.g., private MEC applications associated with the entity, public MEC applications available to any all subscribers of a network associated with the private MEC environment, and/or the like), using 5G network functions, to permit only UEs associated with the entity to access the MEC applications.

Moreover, some implementations described herein permit a private MEC environment to be configured within a network slice of a private network. In such cases, multiple private MEC environments may be configured within a private network that utilizes a same set of physical network resources and/or network devices. Allocation of resources for a network slice for a private MEC environment can be dynamically adjusted and/or configured, enabling flexible bandwidth allocation for the private MEC environment.

FIGS. 1A-1D are diagrams of an example implementation 100 described herein. Example implementation 100 includes a core network with a network orchestrator, an enterprise base station, a UE, and an enterprise platform that includes an enterprise MEC environment (shown as "Enterprise MEC"). As shown in FIG. 1A, in example implementation 100, the enterprise MEC environment includes virtual network functions (VNFs), enterprise MEC applications, mobile network operator (MNO) MEC applications, and an authentication/policy component. The enterprise platform may include one or more devices (e.g., server devices) that host the enterprise MEC environment. The enterprise platform may be collocated with the enterprise base station (e.g., within the enterprise base station, at a same enterprise location as the enterprise base station, and/or the like).

Example implementation 100 is described in connection with an enterprise, which may be a private entity. However, example implementation 100 may correspondingly apply to any other type of private entity. Furthermore, the enterprise may a customer of a network service provider associated with the core network. The network service provider may provide communication services involved in configuring a private network that includes a private 5G MEC environment, as described herein.

As further shown in FIG. 1A, and by reference number 110, the network orchestrator provisions an enterprise RAN. The enterprise RAN may be a private RAN that can be accessed only by UEs associated with the enterprise. The enterprise RAN may be supported by the enterprise base station. Accordingly, UEs within signal range of the enterprise base station may communicate with the enterprise base station. For example, the enterprise base station may be configured to enable communication with UEs that are on a campus or location of the enterprise (which is identified as the "enterprise area" in FIG. 1A). In some implementations, as described herein, the enterprise base station may be an LTE base station, an eLTE base station, a standalone NR base station, or a non-standalone NR base station.

In order to provision the enterprise RAN, the network orchestrator may obtain a private identifier for the enterprise RAN. For example, the network orchestrator may receive the private identifier and/or generate the private identifier for the enterprise RAN. The private identifier may include a public land mobile network (PLMN) identification (ID) and/or a closed subscriber group (CSG) ID. The network orchestrator may assign the private identifier to the enterprise base station such that the enterprise base station may allow only UEs that are configured with the private identifier (e.g., UEs that have a subscriber identification module (SIM) card that includes and/or identifies the private identifier) to access the enterprise RAN. Accordingly, if the UE is configured with the private identifier, the enterprise base station may permit access to the enterprise RAN and/or enterprise platform, and if the UE is not configured with the private identifier, the enterprise RAN may prevent access to the enterprise RAN and/or the enterprise platform.

As further shown in FIG. 1A, and by reference number 120, the network orchestrator provisions the enterprise platform to provide the enterprise MEC environment. For example, the network orchestrator may deploy and/or install the VNFs and/or authentication/policy functions to the enterprise platform to implement the enterprise MEC environment. As described herein, such VNFs may include one or more Next Generation Core (NGC) network functions. The NGC network functions may include one or more of a network slice selection function (NSSF), a network exposure function (NEF), a network resource function (NRF), an applications function (AF), a session management function (SMF), a user plane function (UPF), and/or the like. Additionally, or alternatively, the VNFs may include a combination of one or more NGC network functions and one or more Evolved Packet Core (EPC) network functions, such as a mobility management entity, a serving gateway (S-gateway), a packet data node gateway (PGW), and/or the like.

In some implementations, the enterprise MEC environment may be implemented via a plurality of enterprise platforms (e.g., enterprise platforms that are remotely located from one another). In such cases, the VNFs of the enterprise MEC environment may be configured within one or more of the enterprise platforms to provide a MEC orchestrator to provide system level management and coordinate services provided by each of the enterprise platforms. Furthermore, in such cases, one or more of the VNFs of each of the enterprise platforms may be configured as a MEC platform manager, and/or the like to permit the UE to interact with the MEC applications of the enterprise MEC environment. In some implementations, the MEC orchestrator and/or the MEC platform manager can serve as AFs that enable authorized UEs to interact (e.g., via a UPF of the enterprise MEC environment) with the MEC applications.

In some implementations, the authentication/policy functions may include NGC authentication and/or NGC policy functions, such as an authentication server function (AUSF), a policy control function (PCF), a unified data management (UDM) function, and/or the like. Additionally, or alternatively, the authentication/policy functions may include EPC authentication and/or EPC policy functions, such as a home subscriber server (HSS), a policy and charging rules function (PCRF), and/or the like.

According to some implementations, the network orchestrator and/or enterprise platform may install and/or configure the MEC applications of the enterprise MEC environment. The MEC applications may be publicly available MEC applications (e.g., MEC applications made available to UEs that are not associated with the enterprise, such as subscribers of the network service provider associated with the core network). In such cases, the network orchestrator may provide and/or install the public MEC applications within the enterprise MEC environment. Additionally, or alternatively, MEC applications may be private MEC applications that are associated with the enterprise. For example, the MEC applications may include one or more private MEC applications that can only be accessed by a UE associated with the enterprise and/or via the enterprise MEC environment. In some implementations, the private MEC applications may be developed and/or installed using the enterprise platform. According to some implementations, the MEC applications may be mapped to one or more AFs of the enterprise MEC environment.

As further shown in FIG. 1A, and by reference number 130, the network orchestrator configures the enterprise RAN to provide access to the enterprise MEC environment. In some implementations, the network orchestrator may configure a communication interface between the enterprise RAN and the enterprise MEC environment. For example, the network orchestrator may establish a communication link between the enterprise MEC environment and the enterprise RAN. The network orchestrator may configure the enterprise RAN to communicate with the enterprise platform via one or more communication links using any suitable technique.

Furthermore, in some implementations, the network orchestrator may configure a communication link between the enterprise RAN and the core network to permit UEs in communication with the enterprise RAN to communicate with another RAN associated with the core network (e.g., a public RAN or a RAN available to other subscribers associated with the network service provider). Therefore, in such cases, the UE may continue to communicate with and/or access the enterprise MEC environment when the UE is not within the enterprise area. For example, the UE may access the MEC environment via the enterprise RAN through a base station that is associated with another RAN associated with the network service provider that controls the core network. In some implementations, the network orchestrator may configure access to the enterprise MEC environment such that a session involving the enterprise MEC environment may only be initiated from the enterprise area. In other words, the UE may not be able to engage in a communication session (e.g., a PDU session) with the enterprise MEC environment unless the UE was in the enterprise area (in communication with the enterprise base station) when the communication session was started. In such a case, the UE may continue the communication session, via another base station (e.g., a base station that is not associated with the private RAN) after the UE leaves the enterprise area. In some implementations, in such a case, if the UE initiates a communication session from outside the enterprise area (e.g., through another base station other than a base station of the enterprise RAN), the UE may not engage in a communication session with the enterprise MEC environment. On the other hand, the network orchestrator may configure the enterprise MEC environment such that a UE may access the enterprise MEC environment regardless of where the UE is located when the communication session is initiated or through which base station the UE initiated the communication session.

In some implementations, the network orchestrator may perform one or more actions associated with the enterprise MEC environment to enable access to the enterprise MEC environment. For example, the network orchestrator may activate and/or enable access to the enterprise MEC environment. For example, the network orchestrator may configure an enterprise authentication process that enables the enterprise (e.g., representatives of the enterprise) to log in to the enterprise MEC environment. Accordingly, once configured the network orchestrator may permit the enterprise to control one or more operations and/or functions of the enterprise MEC environment. For example, the network orchestrator may perform one or more actions to permit the enterprise to modify and/or edit the enterprise MEC environment. More specifically, the network orchestrator may provide authorization that permits the enterprise to install, update, customize, and/or remove MEC applications associated with the enterprise MEC environment. Additionally, or alternatively, the network orchestrator may permit the enterprise to configure accessibility associated with accessing the enterprise MEC environment. In some implementations, the network orchestrator may permit the enterprise to configure resource allocation associated with the enterprise MEC environment. For example, the enterprise may configure resources to be dynamically allocated to vary allocation based on one or more parameters (e.g., time, bandwidth, traffic, number of UEs connected to the enterprise MEC environment, number of MEC applications being accessed, types of MEC applications being accessed, and/or the like).

In this way, the network orchestrator may configure an enterprise network for an enterprise that includes an enterprise RAN of the entity and an enterprise MEC environment hosted on an enterprise platform of the entity that allows for flexible resource allocation and processing of MEC applications.

Figure 1B:
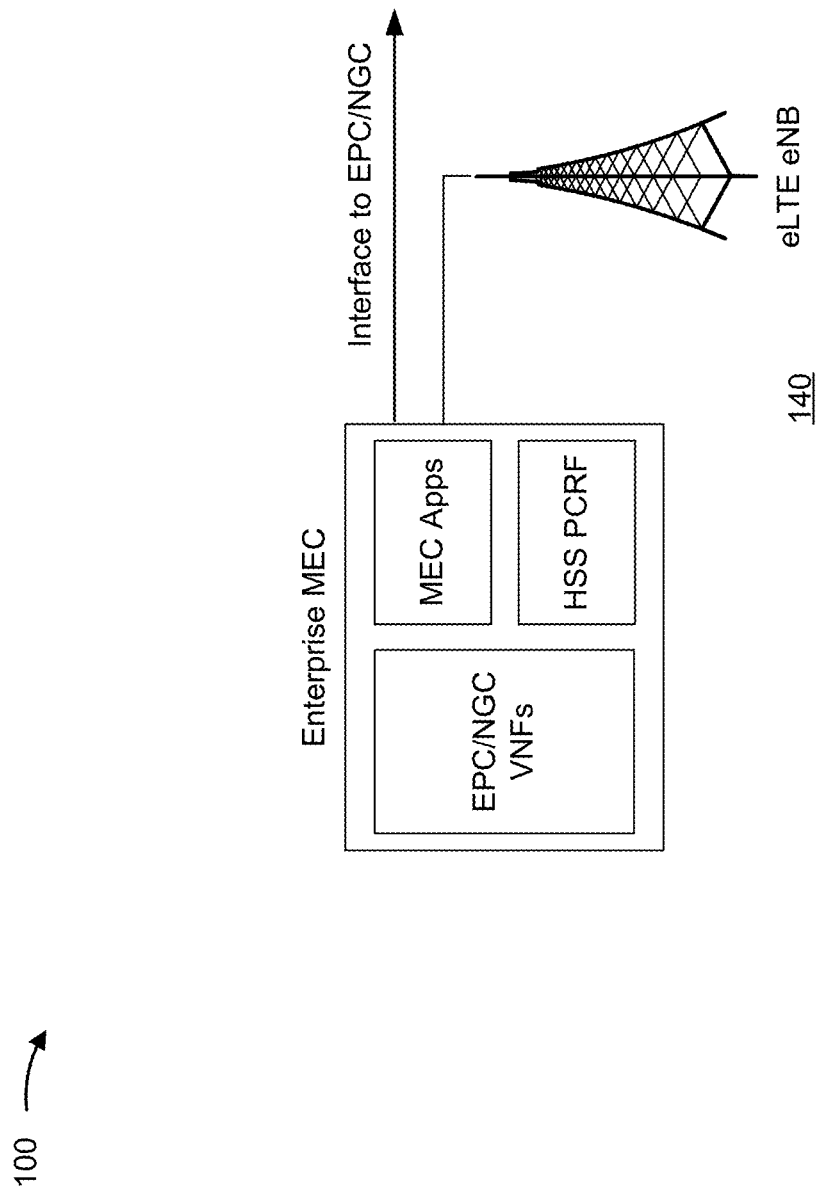

As shown in FIG. 1B, and by reference number 140, an enterprise MEC environment may be configured using an eLTE base station (shown as eLTE eNB) (e.g., a base station configured to use eLTE technologies). The enterprise MEC environment of FIG. 1B may correspond to the enterprise MEC environment of FIG. 1A. Furthermore, the eLTE base station of FIG. 1B may correspond to the enterprise base station of FIG. 1A and support the enterprise RAN described above.

In some implementations, the eLTE base station may utilize a RAT that may be configured to use both LTE and NR network functions. Accordingly, as shown, the enterprise MEC environment may be configured to include both EPC network and NGC network functions (shown as "EPC/NGC VNFs"). Furthermore, the authentication/policy component may include an HSS component and/or a PCRF component. As shown, the enterprise MEC environment of FIG. 1B may be configured to communicate with a core network associated with an EPC network and/or NGC network.

In this way, the network orchestrator may provision an enterprise RAN, that includes an eLTE base station, for use with the enterprise MEC environment as described herein.

Figure 1C:
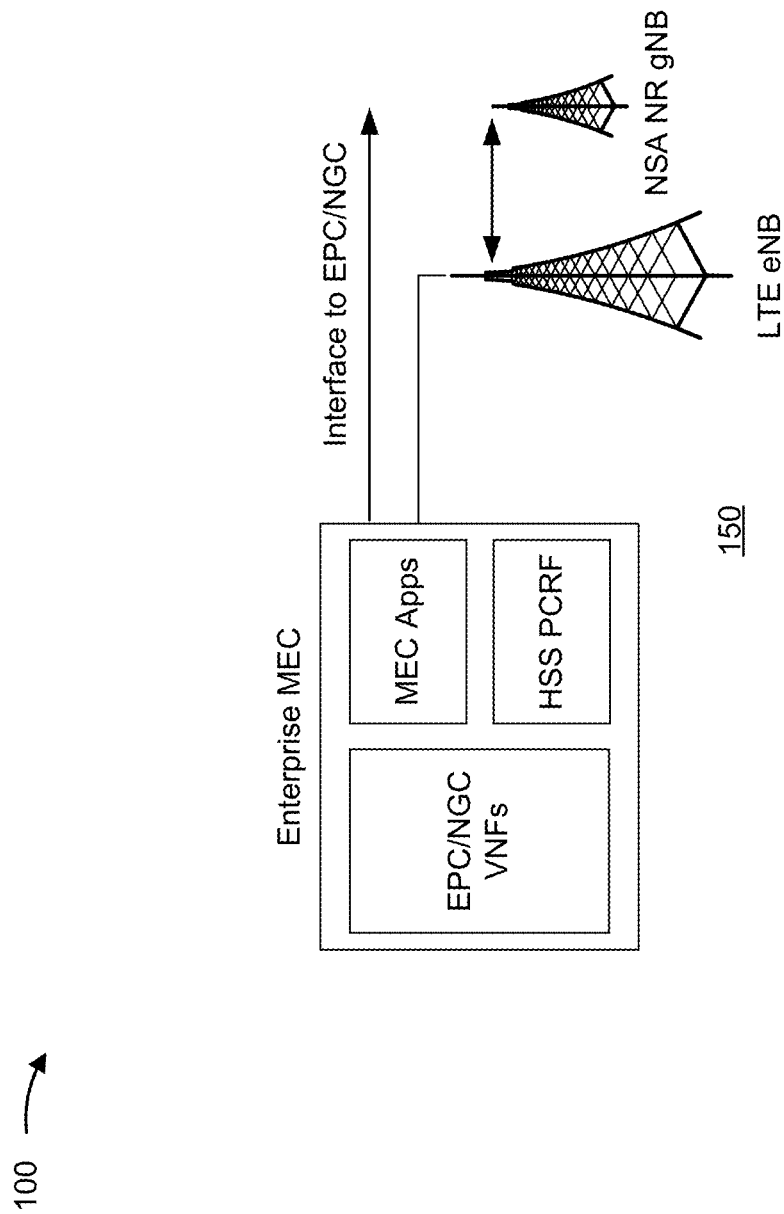

As shown in FIG. 1C, and by reference number 150, an enterprise MEC environment may be configured using an LTE base station (shown as LTE eNB) (e.g., a base station configured to use LTE technologies) and a non-standalone NR base station (shown as NSA NR gNB) (e.g., a base station configured to use NR technologies). The enterprise MEC environment of FIG. 1C may correspond to the enterprise MEC environment of FIG. 1A. Furthermore, the LTE base station and/or the non-standalone NR base station of FIG. 1C may correspond to the enterprise base station of FIG. 1A and support the enterprise RAN described above.

In some implementations, to enable 5G services for the enterprise MEC environment, the LTE base station may be linked with the non-standalone NR base station. Similar to the example described in connection with FIG. 1B, the enterprise MEC environment may be configured to include both EPC network functions and NGC network functions and the authentication/policy component may include an HSS component and a PCRF component. As shown, the enterprise MEC environment of FIG. 1B may be configured to communicate with a core network associated with an EPC network and/or NGC network.

In some implementations, the LTE base station may be a pre-existing base station that is reconfigured, by the network orchestrator, within the enterprise RAN to support the private enterprise RAN along with the non-standalone NR base station. Accordingly, the enterprise RAN may be updated to permit 5G access to the enterprise MEC environment.

In this way, the network orchestrator may provision an enterprise RAN, that includes an LTE base station and a non-standalone NR base station, for use with the enterprise MEC environment as described herein.

Figure 1D:
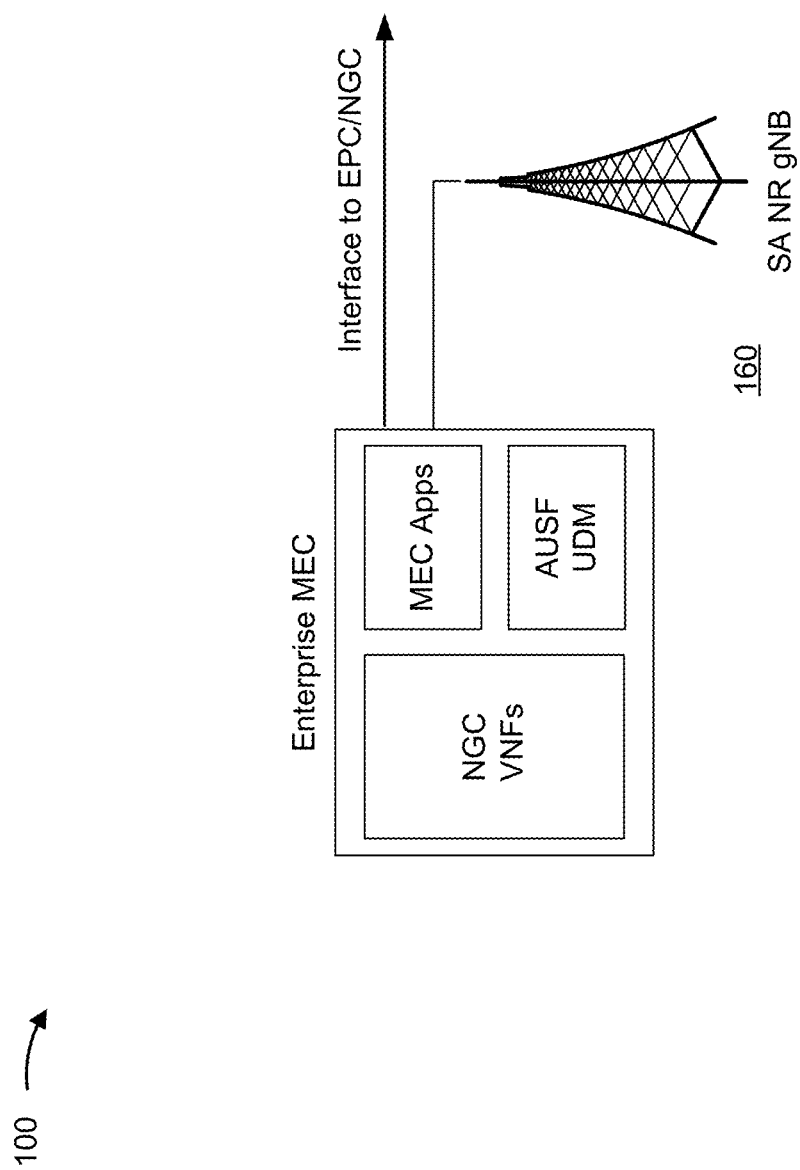

As shown in FIG. 1D, and by reference number 160, an enterprise MEC environment may be configured using a standalone NR base station (shown as SA NR gNB). The enterprise MEC environment of FIG. 1D may correspond to the enterprise MEC environment of FIG. 1A. Furthermore, the standalone NR base station of FIG. 1D may correspond to the enterprise base station of FIG. 1A and support the enterprise RAN described above.

The NR base station may use a RAT that enables flexible resource allocation and/or flexible slot structure. Accordingly, as shown, the enterprise MEC environment may include NGC network functions and may exclude EPC network functions. Furthermore, the authentication/policy component may include an AUSF component and/or a UDM function. As shown, the enterprise MEC environment of FIG. 1D may be configured to communicate with a core network associated with an EPC network and/or NGC network. Accordingly, the network orchestrator may provision an enterprise RAN, that includes a standalone NR base station, for use with the enterprise MEC environment as described herein.

In this way, a private MEC environment can be configured to host MEC applications, associated with a private entity (e.g., the enterprise of example implementation 100), that require a service-based architecture that offers URLLC, relatively high throughput, scalability, QoS on a per-flow basis, flexible bandwidth allocation, and/or the like. Accordingly, only UEs associated with the private entity can access such MEC applications via the private MEC environment, which permits the private entity to secure information associated with the private MEC environment.

As indicated above, FIGS. 1A-1D are provided merely as an example. Other examples can differ from what was described with regard to FIGS. 1A-1D.

Figure 2:
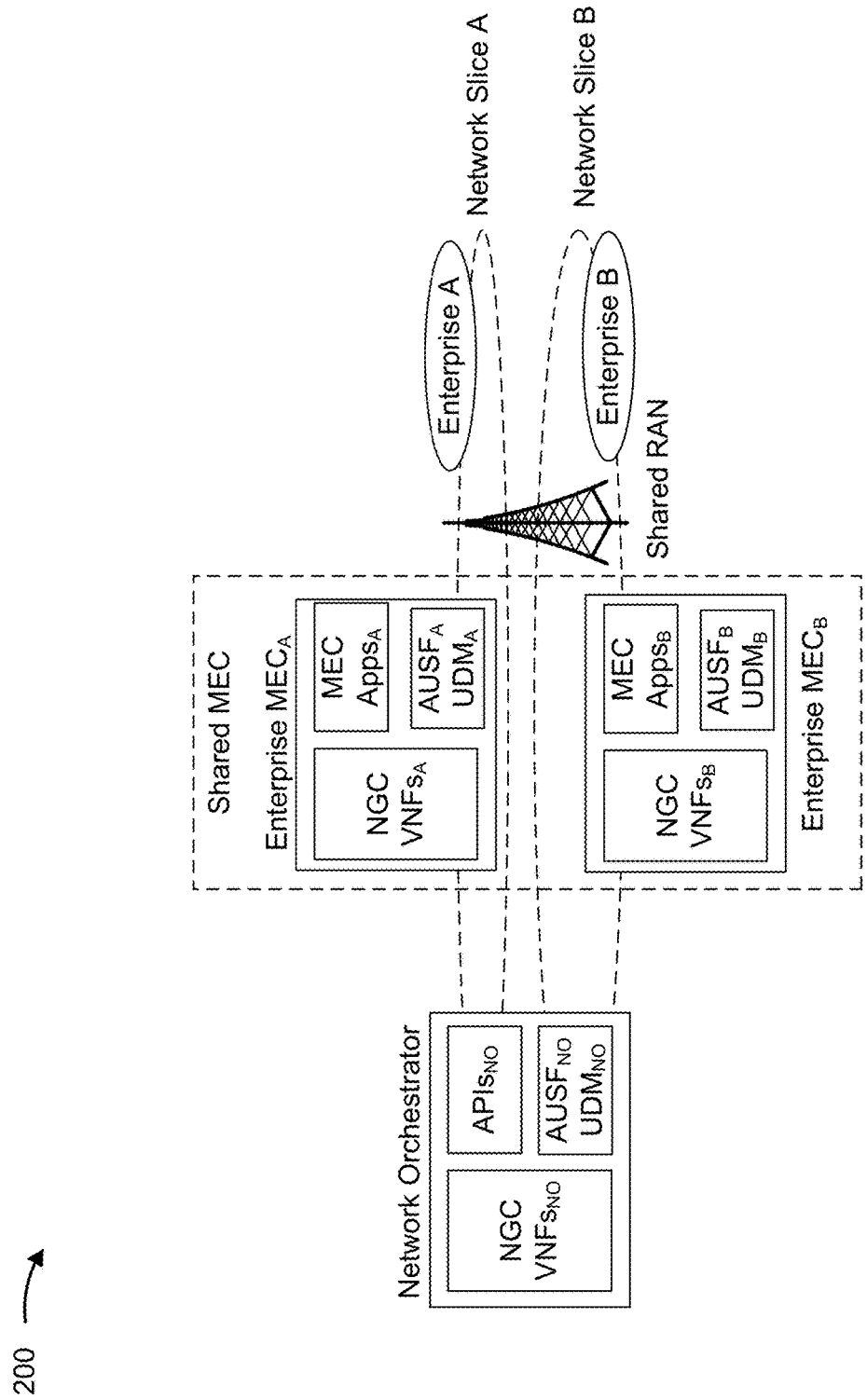
FIG. 2 is a diagram of an example implementation described herein.

FIG. 2 is a diagram of an example implementation 200 described herein. Example implementation 200 includes a RAN, a MEC environment, and a network orchestrator. In a 5G wireless telecommunications network, network slicing allows for multiple virtual networks (referred to as "network slice instances") to run on a single, shared physical network to support multiple services, applications, and/or entities (e.g., end users, customers, such as organizations that provide a service to end users of the wireless telecommunications systems, and/or the like). In network slicing, network traffic in one network slice instances does not affect or impact the network traffic in another network slice instance as the network slice instances are considered as separate networks, despite using the same physical resources. According to some implementations, as described herein, physical resources (e.g., network resources, computing resources, and/or the like) of the MEC environment can be divided into network slice instances using network slicing.

In example implementation 200, the network orchestrator may configure network slices (shown as "Network Slice A" and Network Slice B") for multiple enterprises (shown as "Enterprise A" and "Enterprise B"). Accordingly, physical resources associated with the RAN and physical resources associated with the MEC environment may be shared by Enterprise A and Enterprise B. In example implementation 200, the network orchestrator may divide resources of the RAN and/or the MEC environment into separate network slice instances, such that a first set of resources of the shared RAN are used to implement network slice A and a second set of resources (which are mutually exclusive from the first set of network resources at any given moment) are used to implement network slice B. Therefore, as shown, resources of the MEC environment may be divided to form Enterprise $MEC_A$ for Enterprise A using network slice A and Enterprise $MEC_B$ for Enterprise B using network slice B. Enterprise $MEC_A$ and/or Enterprise $MEC_B$ may be private MEC environments, as described herein. Accordingly, each of Enterprise $MEC_A$ and/or Enterprise $MEC_B$ may include separate and/or different NGC network functions, separate and/or different MEC applications, separate and/or different AUSF components, and/or separate and/or different UDM components. In some implementations, one or more NGC network functions of the MEC environment may be shared by both Enterprise $MEC_A$ and Enterprise $MEC_B$. Furthermore, each of network slice A and Network Slice B can be configured as a private RAN as described herein. Therefore, using the same physical resources, two private networks can be formed for Enterprise A and Enterprise B.

Enterprise A and Enterprise B may be enterprises that are located and operate in a same area (e.g., within a same building, on a same campus, within a same service area of a base station, and/or the like). In some implementations, Enterprise A and Enterprise B may be separate business units of a same entity, separate entities that may have an affiliation with one another (e.g., a business relationship), separate entities that are not affiliated with one another (e.g., that have no relationship or affiliation with one another), and/or the like. Accordingly, though Enterprise A and Enterprise B may or may not have a business relationship, Enterprise A and Enterprise B may share physical resources of a MEC and/or a RAN.

As described herein, the network orchestrator may allocate, dynamically and/or in real-time, physical resources of the MEC and the RAN according to one or more parameters associated with Enterprise A and/or Enterprise B (e.g., subscription type associated with the enterprise, a subscriber status (whether or not the enterprise is in good standing), number of UEs associated with the enterprise, a service level associated with the enterprise, and/or the like). For example, the resources may be configured according to service level agreements (SLAs) associated with Enterprise A and Enterprise B. Such SLAs may define QoS, latency requirements, reliability requirements, bandwidth requirements, quantity of subscribers, and/or the like. As shown, the network orchestrator may use one or more NGC network functions, an AUSF, a UDM, and/or one or more APIs to control network slicing in association with the RAN and MEC of example implementation 200.

In this way, the private network may be configured to have multiple network slice instances that may enable a plurality of private virtual MEC environments to be configured using a same set of physical network devices and/or physical network resources. In other words, using network slicing, in some implementations, the network orchestrator may permit physical resources associated with a private MEC environment to be divided into separate, private MEC environments.

As indicated above, FIG. 2 is provided merely as an example. Other examples can differ from what was described with regard to FIG. 2.

Figure 3:
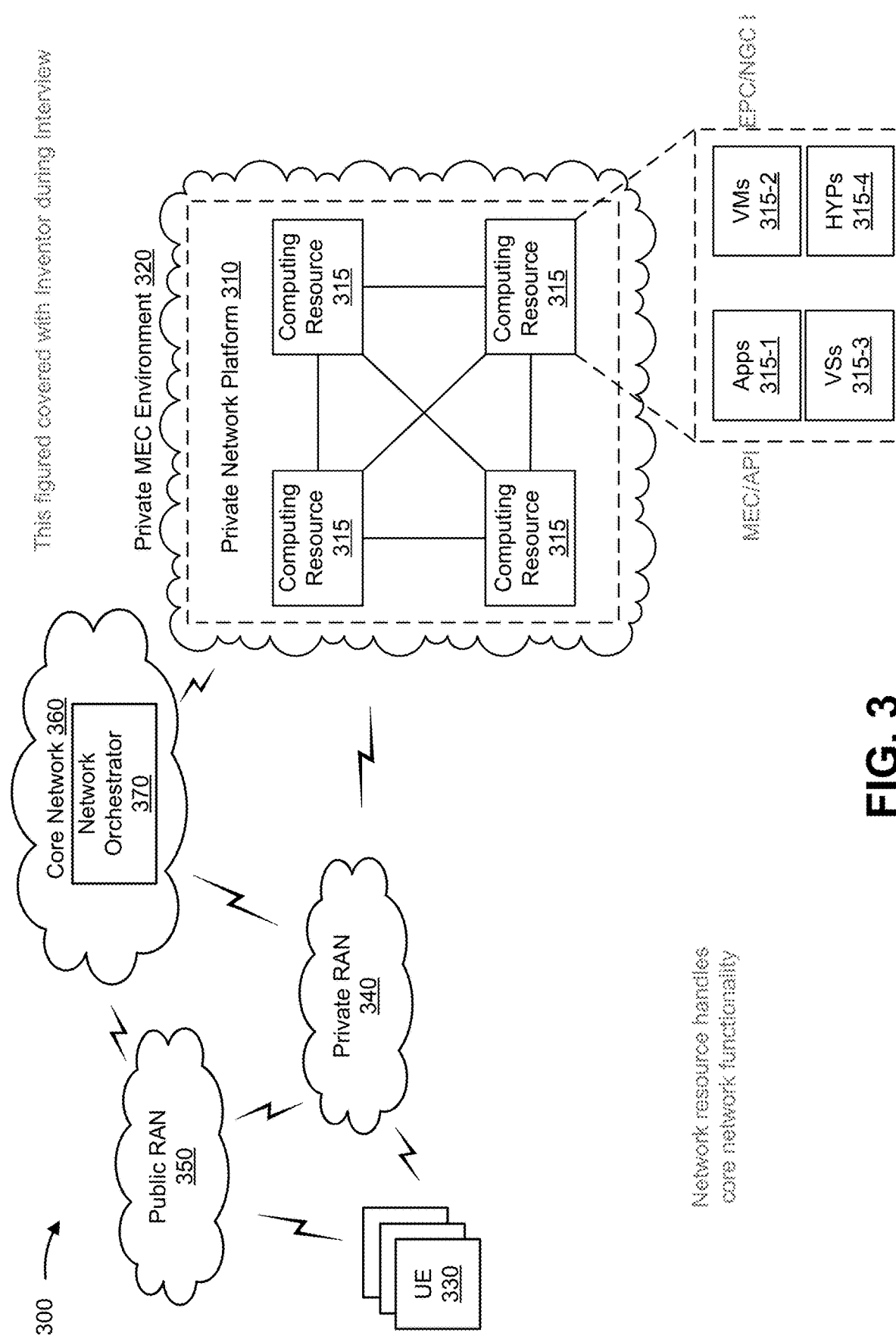
FIG. 3 is a diagram of an example environment in which systems and/or methods described herein may be implemented.

FIG. 3 is a diagram of an example environment 300 in which systems and/or methods, described herein, may be implemented. As shown in FIG. 3, environment 300 may include a private network platform 310, a computing resource 315, a private MEC environment 320, one or more UEs 330 (referred to individually as "UE 330" and collectively as "UEs 330"), a private RAN 340, a public RAN 350, a core network 360, and a network orchestrator 370. Devices and/or networks of environment 300 may interconnect via wired connections, wireless connections, or a combination of wired and wireless connections.

Private network platform 310 includes one or more computing resources assigned to receive, provide, process, and/or generate information associated with MEC applications, as described herein. For example, private network platform 310 may be a platform implemented by private MEC environment 320 that may execute MEC applications according to requests and/or instructions from UEs associated with a private entity. In some implementations, private network platform 310 is implemented by computing resources 315 of private MEC environment 320.

Private network platform 310 may include a server device or a group of server devices. In some implementations, private network platform 310 may be hosted in private MEC environment 320. Notably, while implementations described herein describe private network platform 310 as being hosted in private MEC environment 320, in some implementations, private network platform 310 may be partially cloud-based.

Private MEC environment 320 includes an environment that delivers computing as a service, whereby shared resources, services, etc. may be provided to UE 330. Private MEC environment 320 may provide computation, software, data access, storage, and/or other services that do not require end-user knowledge of a physical location and configuration of a system and/or a device that delivers the services. As shown, private MEC environment 320 may include private network platform 310 and computing resource 315.

Computing resource 315 includes one or more personal computers, workstation computers, server devices, or another type of computation and/or communication device. In some implementations, computing resource 315 may host private network platform 310. The cloud resources may include compute instances executing in computing resource 315, storage devices provided in computing resource 315, data transfer devices provided by computing resource 315, etc. In some implementations, computing resource 315 may communicate with other computing resources 315 via wired connections, wireless connections, or a combination of wired and wireless connections.

As further shown in FIG. 3, computing resource 315 may include a group of cloud resources, such as one or more applications ("APPs") 315-1, one or more virtual machines ("VMs") 315-2, virtualized storage ("VSs") 315-3, one or more hypervisors ("HYPs") 315-4, or the like.

Application 315-1 includes one or more software applications that may be provided to or accessed by UE 330. Application 315-1 may eliminate a need to install and execute the software applications on UE 330. For example, application 315-1 may include software associated with private network platform 310 and/or any other software capable of being provided via private MEC environment 320. In some implementations, one application 315-1 may send/receive information to/from one or more other applications 315-1, via virtual machine 315-2.

Virtual machine 315-2 includes a software implementation of a machine (e.g., a computer) that executes programs like a physical machine. Virtual machine 315-2 may be either a system virtual machine or a process virtual machine, depending upon use and degree of correspondence to any real machine by virtual machine 315-2. A system virtual machine may provide a complete system platform that supports execution of a complete operating system ("OS"). A process virtual machine may execute a single program and may support a single process. In some implementations, virtual machine 315-2 may execute on behalf of a user (e.g., UE 330), and may manage infrastructure of private MEC environment 320, such as data management, synchronization, or long-duration data transfers. In some implementations, virtual machine 315-2 may be used to implement one or more network functions and/or authentication/policy components as described herein.

Virtualized storage 315-3 includes one or more storage systems and/or one or more devices that use virtualization techniques within the storage systems or devices of computing resource 315. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 315-4 provides hardware virtualization techniques that allow multiple operating systems (e.g., "guest operating systems") to execute concurrently on a host computer, such as computing resource 315. Hypervisor 315-4 may present a virtual operating platform to the guest operating systems and may manage the execution of the guest operating systems. Multiple instances of a variety of operating systems may share virtualized hardware resources.

UE 330 may include one or more devices capable of communicating with a base station of private RAN 340, public RAN 350, and/or an environment (e.g., a private MEC environment 320, a data network associated with core network 360, and/or the like). UE 330 may be associated with a private entity that is associated with private MEC environment 320. For example, UE 330 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 330 may be capable of communicating using uplink (e.g., UE to base station) communications, downlink (e.g., base station to UE) communications, and/or sidelink (e.g., UE-to-UE) communications. In some implementations, UE 330 may include a machine-type communication (MTC) UE, such as an evolved or enhanced MTC (eMTC) UE. In some implementations, UE 330 may include an Internet of Things (IoT) UE, such as a narrowband IoT (NB-IoT) UE and/or the like.

Private RAN 340 includes one or more base stations configured to enable UEs associated with a private entity (e.g., UEs configured with a private identifier) to access private MEC environment 320. For example, private RAN 340 may correspond to the enterprise RAN of example implementation 100 and/or example implementation 200. Public RAN 350 includes one or more base stations configured to enable UEs associated with a network service provider to use services associated with core network 360, to access private MEC environment 320, and/or to communicate with another UE.

A base station includes one or more devices capable of communicating with UE 330 using a cellular RAT. For example, the base station may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. The base station may transfer traffic between UE 330 (e.g., using a cellular RAT), other base stations (e.g., using a wireless interface or a backhaul interface, such as a wired backhaul interface), private MEC environment 320, core network 360, and/or the like. The base station may provide one or more cells that cover geographic areas. Some base stations may be mobile base stations. Some base stations may be capable of communicating using multiple RATs.

In some implementations, a base station may perform scheduling and/or resource management for UEs 330 covered by the base station (e.g., UEs 330 covered by a cell provided by base stations of the private RAN 340 or public RAN 350). In some implementations, base stations of private RAN 340 and/or public RAN 350 may be controlled or coordinated by a network controller, which may perform load balancing, network-level configuration, and/or the like. The network controller may communicate with the base stations private RAN 340 and/or public RAN 350 via a wireless or wireline backhaul. In some implementations, a base station of private RAN 340 and/or public RAN 350 may perform network control, scheduling, and/or network management functions.

In some implementations, a base station of private RAN 340 and/or public RAN 350 may include a central unit and multiple distributed units. The central unit may coordinate access control and communication with regard to the multiple distributed units. The multiple distributed units may provide UEs 330 and/or other base stations with access to other UEs 330, private MEC environment 320, core network 360, and/or a data network associated with core network 360.

Core network 360 can include various types of core network architectures, such as a 5G NG Core (e.g., core network 300 of FIG. 3), an LTE EPC, and/or the like. In some implementations, core network 360 can be implemented on physical devices, such as a gateway, a mobility management entity, and/or the like. In some implementations, the hardware and/or software implementing core network 360 can be virtualized (e.g., through use of network function virtualization and/or software-defined networking), thereby allowing for the use of composable infrastructure when implementing core network 360. In this way, networking, storage, and compute resources can be allocated to implement the functions of core network 360 in a flexible manner as opposed to relying on dedicated hardware and software to implement these functions.

Network orchestrator 370 includes one or more functions of core network configured to perform management and orchestration of private MEC environment 320, private RAN 340, public RAN 350, and/or the like. Network orchestrator 370 may include one or more functions to permit UEs 330 to utilize services offered and/or provided by core network 360.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
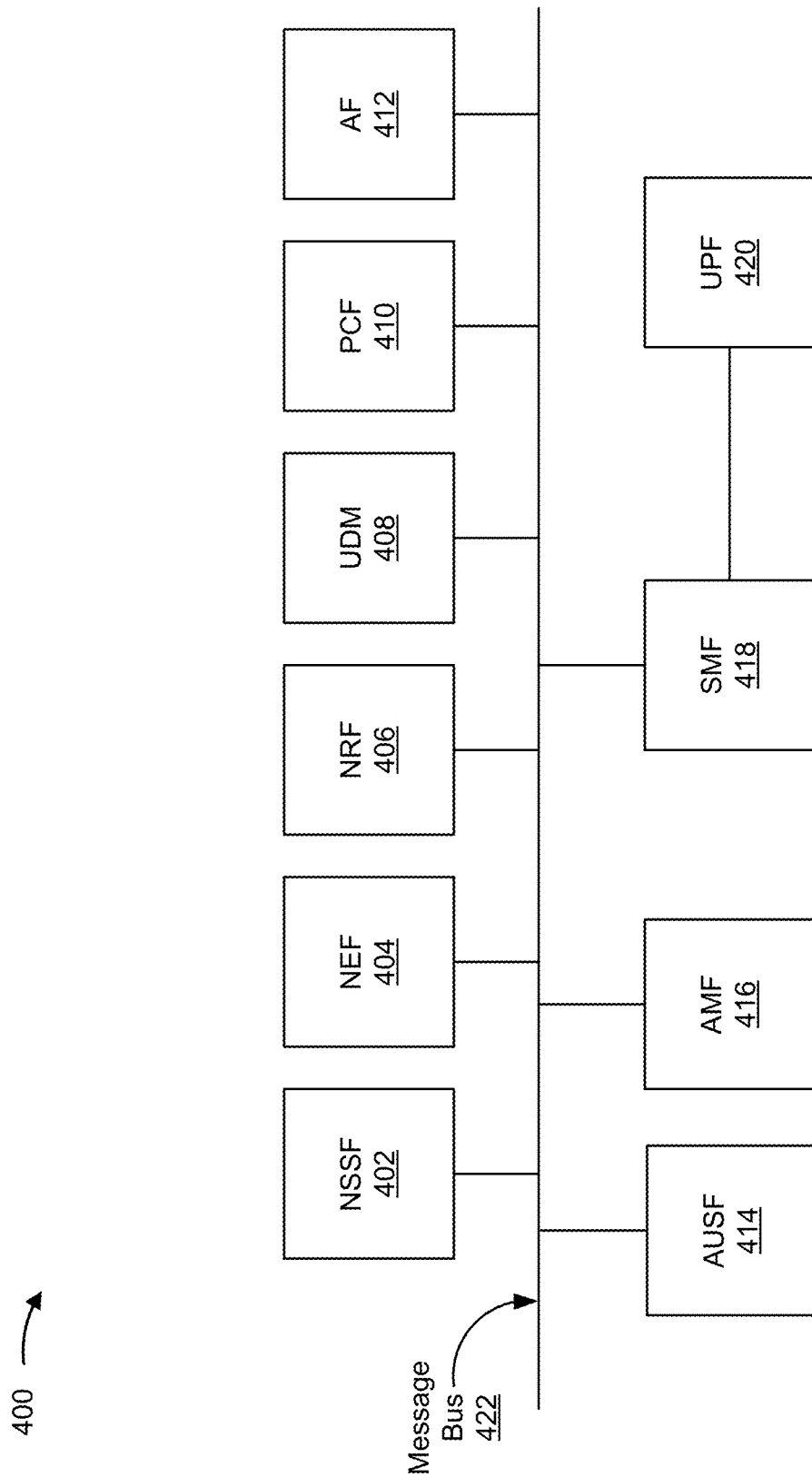
FIG. 4 is a diagram of an example functional architecture of an example core network described herein.

FIG. 4 is a diagram of an example functional architecture of a core network 400 in which systems and/or methods, described herein, can be implemented. For example, FIG. 4 can show an example functional architecture of a 5G NG core network included in a 5G wireless telecommunications system. In some implementations, the example functional architecture can be implemented within a core network (e.g., core network 360 of FIG. 3), can be implemented within a cloud environment (e.g., private MEC environment 320), and/or can be implemented by one or more devices (e.g., a device described with respect to FIG. 5). While the example functional architecture of core network 400 shown in FIG. 4 can be an example of a service-based architecture, in some implementations, core network 400 can be implemented as a reference-point architecture.

As shown in FIG. 4, core network 400 can include a number of functional elements. The functional elements can include, for example, an NSSF 402, an NEF 404, an NRF 406, a UDM component 408, a PCF 410, an AF 412, an AUSF 414, an AMF 416, an SMF 418, and a UPF 420. These functional elements can be communicatively connected via a message bus 422, which can be comprised of one or more physical communication channels and/or one or more virtual communication channels. Each of the functional elements shown in FIG. 4 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, the core network 400 can be operatively connected to a private MEC environment (e.g., private MEC environment 320), a RAN (e.g., public RAN 350, private RAN 340, and/or the like), a data network, and/or the like, via wired and/or wireless connections with UPF 420.

NSSF 402 can select network slice instances for UE's, where NSSF 402 can determine a set of network slice policies to be applied at a RAN (e.g., private RAN 340, public RAN 350, and/or the like). By providing network slicing, NSSF 402 allows an operator to deploy multiple substantially independent end-to-end networks potentially with the same infrastructure. In some implementations, each slice can be customized for different services. NEF 404 can support the exposure of capabilities and/or events in the wireless telecommunications system to help other entities in the wireless telecommunications system discover network services and/or utilize network resources efficiently.

NRF 406 may be a repository of registered network functions and services provided by the network functions of core network 400. UDM 408 can store subscriber data and profiles in the wireless telecommunications system. UDM 408 can be used for fixed access, mobile access, and/or the like, in core network 400. PCF 410 can provide a policy framework that incorporates network slicing, roaming, packet processing, mobility management, and/or the like.

AF 412 can determine whether UEs provide preferences for a set of network slice policies and support application influence on traffic routing, access to NEF 404, policy control, and/or the like. AUSF 414 can act as an authentication server and support the process of authenticating UEs in the wireless telecommunications system. Additionally, or alternatively, AMF 416 can provide authentication and authorization of UEs and handle mobile related procedures (e.g., handoffs) associated with the UEs. SMF 418 can support the establishment, modification, and release of communications sessions in the wireless telecommunications system. For example, SMF 418 can configure traffic steering policies at UPF 420, enforce UE IP address allocation and policies, and/or the like. AMF 416 and SMF 418 can act as a termination point for Non-Access Stratum (NAS) signaling, mobility management, and/or the like. SMF 418 can act as a termination point for session management related to NAS. A RAN can send information (e.g. the information that identifies the UE) to AMF 416 and/or SMF 418 via PCF 410.

UPF 420 can serve as an anchor point for intra/inter RAT mobility. UPF 420 can apply rules to packets, such as rules pertaining to packet routing, traffic reporting, handling user plane QoS, and/or the like. UPF 420 can determine an attribute of application-specific data that is communicated in a communications session. UPF 420 can receive information (e.g., the information that identifies the communications attribute of the application) from a RAN (e.g., private RAN 340 and/or public RAN 350) via SMF 418 or an API. Message bus 422 represents a communication structure for communication among the functional elements. In other words, message bus 422 can permit communication between two or more functional elements. Message bus 422 can be a message bus, HTTP/2 proxy server, and/or the like.

The number and arrangement of functional elements shown in FIG. 4 are provided as an example. In practice, there can be additional functional elements, fewer functional elements, different functional elements, or differently arranged functional elements than those shown in FIG. 4. Furthermore, two or more functional elements shown in FIG. 4 can be implemented within a single device, or a single functional element shown in FIG. 4 can be implemented as multiple, distributed devices. Additionally, or alternatively, a set of functional elements (e.g., one or more functional elements) of core network 400 can perform one or more functions described as being performed by another set of functional elements of core network 400.

Figure 5:
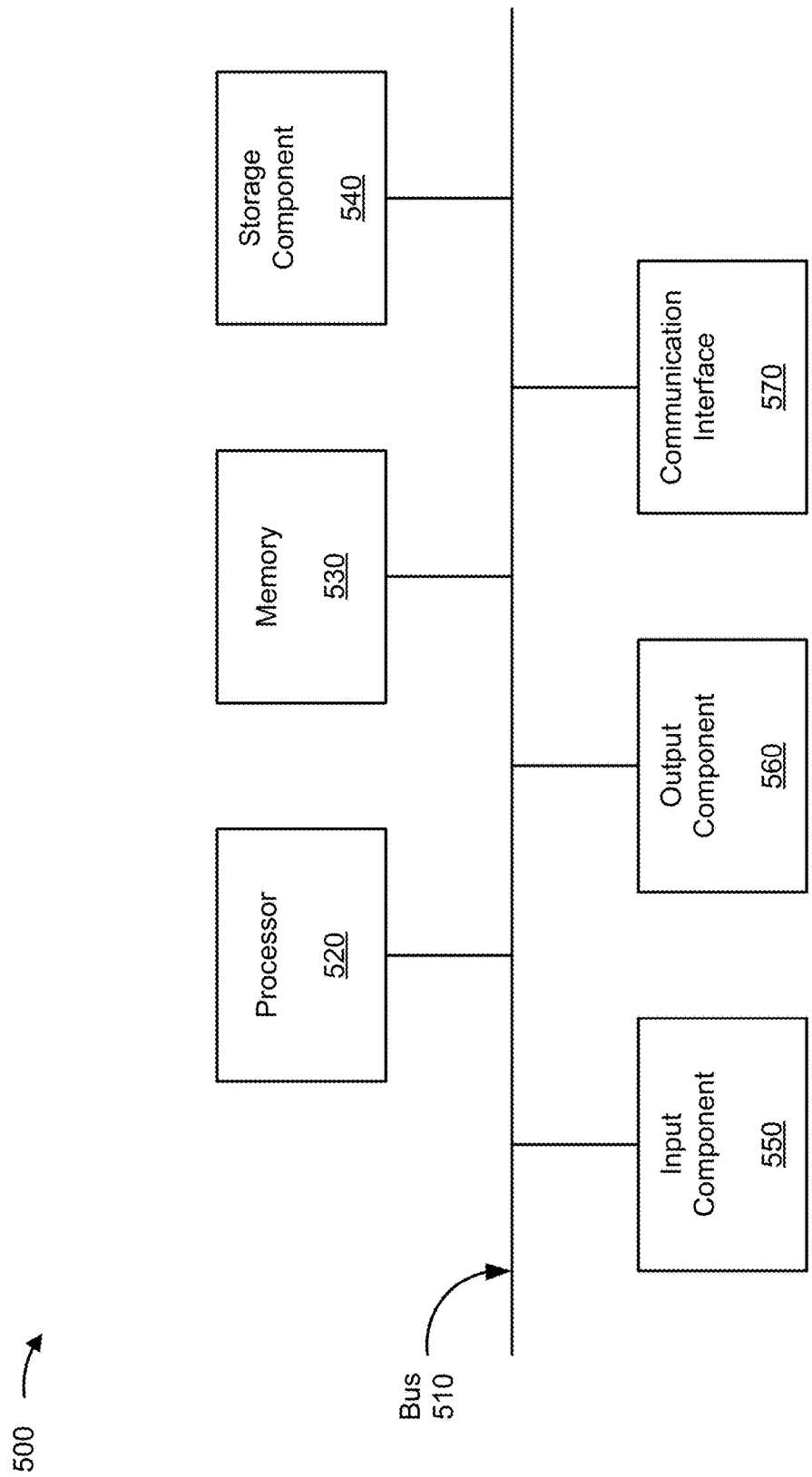
FIG. 5 is a diagram of example components of one or more devices of FIG. 3.

FIG. 5 is a diagram of example components of a device 500. Device 500 may correspond private network platform 310, computing resource 315, UE 330, network orchestrator 370, NSSF 402, NEF 404, NRF 406, UDM 408, PCF 410, AF 412, AMF 416, SMF 418, and/or UPF 420. In some implementations, private network platform 310, computing resource 315, UE 330, network orchestrator 370, NSSF 402, NEF 404, NRF 406, UDM 408, PCF 410, AF 412, AMF 416, SMF 418, and/or UPF 420 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a wireless local area network interface, a cellular network interface, or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
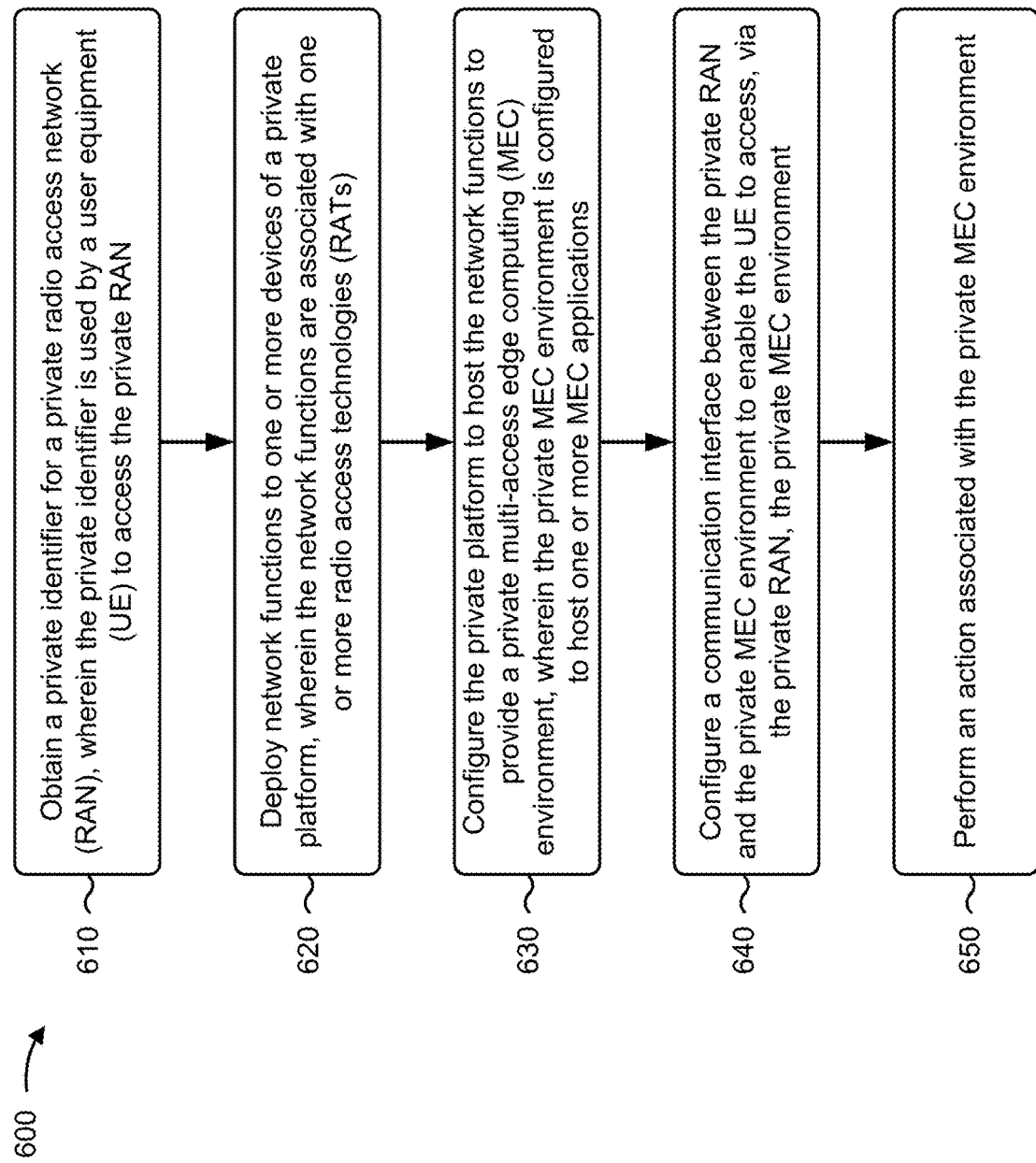
FIG. 6 is a flow chart of an example process for configuring a private multi-access edge computing environment.

FIG. 6 is a flow chart of an example process 600 for configuring a private multi-access edge computing environment. In some implementations, one or more process blocks of FIG. 6 may be performed by a network orchestrator (e.g., network orchestrator 370). In some implementations, one or more process blocks of FIG. 6 may be performed by another device or a group of devices separate from or including the network orchestrator, such as a private network platform (e.g., private network platform 310), a UE (e.g., UE 330), a base station of a private RAN (e.g., private RAN 340), a base station of a public RAN (e.g., public RAN 350), and/or the like.

As shown in FIG. 6, process 600 may include obtaining a private identifier for a private RAN, wherein the private identifier is used by a UE to access the private RAN (block

610). For example, the network orchestrator (e.g., using a processor 520, a memory 530, a storage component 540, an input component 550, and a communication interface 570, and/or the like) may obtain a private identifier for a private RAN, as described above. In some implementations, the private identifier is used by a UE to access the private RAN. In some implementations, the private RAN includes one or more base stations associated with one or more types of RATs. The network orchestrator may provision a RAN as the private RAN.

As further shown in FIG. 6, process 600 may include deploying network functions to one or more devices of a private network platform, wherein the network functions are associated with one or more RATs (block 620). For example, the network orchestrator (e.g., using a processor 520, a memory 530, a storage component 540, an output component 560, and a communication interface 570, and/or the like) may deploy network functions to one or more devices (e.g., server devices) of a private network platform, as described above. In some implementations, the network functions are associated with one or more RATs that provide flexible bandwidth allocation via the private RAN. The one or more RATs may include enhanced eLTE and/or NR.

In some implementations, the network functions include EPC network functions and NGC network functions, the private RAN includes an enhanced Long-Term Evolution (eLTE) base station. The eLTE base station may be configured to communicate with the private network platform to enable the UE to access, via the eLTE base station, the private MEC environment, and communicate with a core network to enable the UE to access the core network. Additionally, or alternatively, private RAN may further include an NR base station. The NR base station is communicatively coupled with the eLTE base station to permit the eLTE base station to communicate with the core network or to permit the UE to communicate with the core network via the eLTE base station In some implementations, the network functions include NGC network functions, and the private RAN includes a New Radio (NR) base station. The NR base station may be configured to communicate with the private network platform to enable the UE to access, via the NR base station, the private MEC environment, and the NR base station may be configured to communicate with a core network to enable the UE to access the core network. In such cases, the private MEC environment may be managed by an AUSF component and/or a UDM component (or function).

As further shown in FIG. 6, process 600 may include configuring the private network platform to host the network functions to provide a private MEC environment, wherein the private MEC environment is configured to host one or more MEC applications (block 630). For example, the network orchestrator (e.g., using a processor 520, a memory 530, a storage component 540, an output component 560, and a communication interface 570, and/or the like) may configure the private network platform to host the network functions to provide a private MEC environment, as described above. In some implementations, the private MEC environment is configured to host one or more MEC applications.

In some implementations, the private RAN and the private network platform provide a private network. The network functions may provide flexible bandwidth allocation and the physical resources of the private network can be separated to provide a plurality of network slice instances. In such cases, each of the network slice instances may be associated with a corresponding private RAN and a corresponding private MEC environment.

In some implementations, the private MEC environment hosts the one or more applications by running the one or more MEC applications according to a request from the UE, and/or providing, to the UE, data associated with running the one or more MEC applications in the private MEC environment.

In some implementations, the private RAN, the private network platform, and the private MEC environment are controlled by a single entity. According to some implementations, the MEC applications may include one or more private MEC applications. The private MEC applications may be accessed for use only by UEs associated with an entity that controls the private network platform, and the entity may have exclusive access to the one or more private MEC applications. For example, the private MEC application may be configured to be accessible only to representatives of the entity. In some implementations, the private MEC environment can only be accessed via a communication session that originates through the private RAN. Additionally, or alternatively, the private MEC environment can be accessed by the UE only via the private RAN.

As further shown in FIG. 6, process 600 may include configuring a communication interface between the private RAN and the private MEC environment to enable the UE to access, via the private RAN, the private MEC environment (block 640). For example, the network orchestrator (e.g., using a processor 520, a memory 530, a storage component 540, an output component 560, and a communication interface 570, and/or the like) may configure a communication interface between the private RAN and the private MEC environment to enable the UE to access, via the private RAN, the private MEC environment, as described above.

In some implementations, the network orchestrator may configure a communication interface between the private RAN and a network (e.g., another RAN, a LAN, a WAN, and/or the like), such that the communication interface between the private RAN and the core network permits the UE to access the MEC applications from the network.

As further shown in FIG. 6, process 600 may include performing an action associated with the private MEC environment (block 650). For example, the network orchestrator (e.g., using a processor 520, a memory 530, a storage component 540, an output component 560, and a communication interface 570, and/or the like) may perform an action associated with permitting the UE to access the private MEC environment and/or the one or more MEC applications, as described above.

Process 600 may include additional implementations, such as any single implementation or any combination of implementations described in connection with one or more other processes described elsewhere herein. Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
obtaining a private identifier for a private radio access network (RAN),
wherein the private identifier is used by a user equipment (UE) to access the private RAN;
deploying network functions to one or more devices of a private network platform,
wherein the network functions are associated with one or more radio access technologies (RATs),
wherein the one or more RATs include at least one of:
enhanced Long-Term Evolution (eLTE), or
New Radio (NR);
configuring the private network platform to host the network functions to provide a private multi-access edge computing (MEC) environment,
wherein the private MEC environment is configured to host one or more MEC applications;
configuring a communication interface between the private RAN and the private MEC environment to enable the UE to access, via the private RAN, the private MEC environment; and
performing an action associated with the private MEC environment.

2. The method of claim 1, wherein the network functions include Evolved Packet Core (EPC) network functions and Next Generation Core (NGC) network functions, and
wherein the private RAN includes a base station,
wherein the base station is configured to communicate with the private network platform to enable the UE to access, via the base station, the private MEC environment, and
wherein the base station is configured to communicate with a core network to enable the UE to access the core network.

3. The method of claim 2, wherein the private RAN further includes a New Radio (NR) base station,
wherein the NR base station is communicatively coupled with the base station to permit the base station to communicate with the core network or to permit the UE to communicate with the core network via the base station.

4. The method of claim 1, wherein the network functions include Next Generation Core (NGC) network functions, and
wherein the private RAN includes a New Radio (NR) base station,
wherein the NR base station is configured to communicate with the private network platform to enable the UE to access, via the NR base station, the private MEC environment, and
wherein the NR base station is configured to communicate with a core network to enable the UE to access the core network.

5. The method of claim 1, wherein the private RAN and the private network platform provide a private network,
wherein the network functions provide flexible bandwidth allocation, and
wherein physical resources of the private network can be separated to provide a plurality of network slice instances,
wherein each of the network slice instances may be associated with a corresponding private RAN and a corresponding private MEC environment.

6. The method of claim 1, further comprising:
configuring a communication interface between the private RAN and a network,
wherein the communication interface between the private RAN and the network permits the UE to access the MEC applications from the network.

7. The method of claim 1, wherein the private MEC environment hosts the one or more MEC applications by:
running the one or more MEC applications according to a request from the UE; and
providing, to the UE, data associated with running the one or more MEC applications in the private MEC environment.

8. A device, comprising:
one or more memories; and one or more processors, communicatively coupled to the one or more memories, to:
provision a radio access network (RAN) as a private RAN,
wherein the private RAN is accessible by a user equipment (UE) using a private identifier, and
wherein the private RAN includes at least one of:
an enhanced Long-Term Evolution (eLTE) base station, or
a New Radio (NR) base station;
configure one or more devices of a private network platform to include network functions associated with the private RAN,
wherein the network functions are associated with a radio access technology (RAT) that provides flexible bandwidth allocation via the private RAN;
configure, based on the network functions, a private multi-access edge computing (MEC) environment within the private network platform,
wherein the private MEC environment is configured to host one or more MEC applications; and
perform an action associated with the private MEC environment to permit the UE to access the one or more MEC applications.

9. The device of claim 8, wherein the private MEC environment hosts the one or more MEC applications by:
running the one or more MEC applications according to a request from the UE, and
providing, to the UE, data associated with running the one or more MEC applications in the private MEC environment.

10. The device of claim 8, wherein the private RAN, the private network platform, and the private MEC environment are controlled by a single entity.

11. The device of claim 8, wherein the MEC applications include one or more private MEC applications,
wherein the private MEC applications may be accessed for use only by UEs associated with an entity that controls the private network platform,
wherein the entity has exclusive access to the one or more private MEC applications.

12. The device of claim 8, wherein the private MEC environment can only be accessed via a communication session that originates through the private RAN.

13. The device of claim 8, wherein the RAT comprises at least one of:
enhanced Long-Term Evolution (eLTE), or
New Radio (NR).

14. The device of claim 8, wherein the NR base station is communicatively coupled with a base station to permit the base station to communicate with a core network or to permit the UE to communicate with a core network via the base station.

15. A non-transitory computer-readable medium storing instructions, the instructions comprising:
one or more instructions that, when executed by one or more processors, cause the one or more processors to:
provision a radio access network (RAN) as a private RAN,
wherein the private RAN is accessible by a user equipment (UE) using a private identifier, and
wherein the private RAN includes one or more base stations associated with one or more types of radio access technologies (RATs);
deploy network functions to one or more server devices of a private network platform associated with an entity,
wherein the network functions include Next Generation Core (NGC) network functions;
configure, based on the network functions, a private multi-access edge computing (MEC) environment within the private network platform,
wherein the private MEC environment is configured to host one or more MEC applications, and
wherein the private MEC environment can be accessed by the UE only via the private RAN; and
perform an action associated with the private MEC environment that permits the UE to access the one or more MEC applications.

16. The non-transitory computer-readable medium of claim 15, wherein the one or more types of RATs include at least one of:
enhanced Long-Term Evolution (eLTE), or
New Radio (NR).

17. The non-transitory computer-readable medium of claim 15, wherein the one or more base stations includes an enhanced Long-Term Evolution (eLTE) base station, and
wherein the network functions further include Evolved Packet Core (EPC) network functions.

18. The non-transitory computer-readable medium of claim 15, wherein the one or more base stations includes a New Radio (NR) base station and the private MEC environment is managed by at least one of:
an authentication server function, or
a unified data management function.

19. The non-transitory computer-readable medium of claim 15, wherein the one or more MEC applications include private MEC applications that are associated with the entity,
wherein the private MEC applications are configured to be accessible only to representatives of the entity.

20. The non-transitory computer-readable medium of claim 15, wherein the one or more NGC network functions includes one or more of:
a network slice selection function (NSSF),
a network exposure function (NEF),
a network resource function (NRF),
an applications function (AF),
a session management function (SMF), or
a user plane function (UPF).

* * * * *